(12) United States Patent
Gueron et al.

(10) Patent No.: US 9,076,019 B2
(45) Date of Patent: Jul. 7, 2015

(54) METHOD AND APPARATUS FOR MEMORY ENCRYPTION WITH INTEGRITY CHECK AND PROTECTION AGAINST REPLAY ATTACKS

(75) Inventors: Shay Gueron, Haifa (IL); Uday Savagaonkar, Portland, OR (US); Francis X. McKeen, Portland, OR (US); Carlos V. Rozas, Portland, OR (US); David M. Durham, Beaverton, OR (US); Jacob Doweck, Haifa (IL); Ofir Mulla, Talmei Elazar (IL); Ittai Anati, Haifa (IL); Zvika Greenfield, Kfar Sava (IL); Moshe Maor, Kiryat Mozking (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,213

(22) PCT Filed: Jun. 29, 2011

(86) PCT No.: PCT/US2011/042413
§ 371 (c)(1),
(2), (4) Date: Mar. 30, 2014

(87) PCT Pub. No.: WO2013/002789
PCT Pub. Date: Jan. 3, 2013

(65) Prior Publication Data
US 2014/0223197 A1 Aug. 7, 2014

(51) Int. Cl.
*G06F 21/00* (2013.01)
*G06F 21/72* (2013.01)
*G06F 12/14* (2006.01)

(52) U.S. Cl.
CPC ............ *G06F 21/72* (2013.01); *G06F 12/1408* (2013.01); *G06F 21/00* (2013.01)

(58) Field of Classification Search
CPC ...... G06F 21/72; G06F 21/00; G06F 12/1408
See application file for complete search history.

(56) References Cited

U.S. PATENT DOCUMENTS

| | | |
|---|---|---|
| 2004/0172532 A1 | 9/2004 | Silverbrook |
| 2008/0163383 A1 | 7/2008 | Kumar et al. |

(Continued)

FOREIGN PATENT DOCUMENTS

| | | |
|---|---|---|
| EP | 1944711 A1 | 7/2008 |
| WO | WO 2007/062941 A2 | 6/2007 |
| WO | 2013002789 A1 | 1/2013 |

OTHER PUBLICATIONS

International Search Report and Written opinion for PCT Patent Application No. PCT/US2011/042413, mailed on Feb. 27, 2012, 12 Pages.

(Continued)

*Primary Examiner* — Jeffrey Pwu
*Assistant Examiner* — William Corum, Jr.
(74) *Attorney, Agent, or Firm* — L. Cho

(57) ABSTRACT

A method and apparatus to provide cryptographic integrity checks and replay protection to protect against hardware attacks on system memory is provided. A mode of operation for block ciphers enhances the standard XTS-AES mode of operation to perform memory encryption by extending a tweak to include a "time stamp" indicator. A tree-based replay protection scheme uses standard XTS-AES to encrypt contents of a cache line in the system memory. A Message-Authentication Code (MAC) for the cache line is encrypted using enhanced XTS-AES and a "time stamp" indicator associated with the cache line. The "time stamp indicator" is stored in a processor.

20 Claims, 6 Drawing Sheets

(56) References Cited

U.S. PATENT DOCUMENTS

| | | | |
|---|---|---|---|
| 2009/0060197 A1 | 3/2009 | Taylor et al. | |
| 2009/0172416 A1 | 7/2009 | Bosch et al. | |
| 2011/0123020 A1* | 5/2011 | Choi et al. | 380/28 |
| 2011/0154059 A1* | 6/2011 | Durham et al. | 713/190 |
| 2012/0079285 A1* | 3/2012 | Gueron et al. | 713/190 |

OTHER PUBLICATIONS

International Preliminary Report on Patentability and Written Opinion received for PCT Patent Application No. PCT/US2011/042413, mailed on Jan. 16, 2014, 5 Pages.

Supplementary European Search Report EP 11 86 8426 dated Sep. 3, 2015 (PCT/US2011042413).

Hatzidimitriou, et al.; "Implementation of a P1619 Crypto-Core for Shared Storage Media", Melecon 2010—2010 15th IEEE Mediterranean Electrotechnical Conference, IEEE, Piscataway, NJ,; Apr. 26, 2010, pp. 597-601.

Alomari, et al.; "A Study on Encryption Algorithms and Modes for Disk Encryption"; 2009 International Conference on Signal Processing Systems, IEEE, Piscataway, NJ,; May 15, 2009, pp. 793-797.

* cited by examiner

METHOD AND APPARATUS FOR MEMORY ENCRYPTION WITH INTEGRITY CHECK AND PROTECTION AGAINST REPLAY ATTACKS

FIELD

This disclosure relates to cryptographic protection of data and in particular to encryption of software applications stored in memory regions in a memory.

BACKGROUND

A region of volatile memory in a system that is used by secure software applications needs to be protected from malicious modifications by unauthorized entities. These malicious modifications, also referred to as "attacks" may be software attacks or hardware attacks. One method to provide confidentiality and integrity protection for secure software applications is to integrate a large volatile memory in the Central Processing Unit (CPU) or processor package, to be used as "private memory" by the secure software applications. However, the integration of a large volatile memory in the CPU package is expensive.

Thus, secure software applications are typically stored in external (that is, external to the CPU) memory. Memory regions (areas) in the external memory to store the secure software applications can be visible or invisible to the Operating System (OS) in the system. If these memory regions are visible to the OS, they need to be protected from software attacks and hardware attacks. If these memory regions are not visible to the OS (called "stolen memory areas"), and there is some access control mechanism, they need to be protected from hardware attacks, that is, from an attacker that has physical access to external memory.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A hardware attack on an external memory, (for example, from an attacker that has physical access to external memory) may be in the form of an attempt to corrupt an image (for example, a software application's executable image or data) stored in the external memory, that is, a memory corruption attack. For example, modification of a cache line in the external memory by an attacker (adversary), which is assumed to be encrypted for confidentiality but with no integrity checks, results in a corrupted decryption of the modified cache line when it is read from memory. If the attacker knows the contents of the image, the attacker can selectively corrupt a string variable (or other constant/variable) at the physical memory location in a protected memory region in external memory in which it is stored. Modifying this variable could result in various conditions, for example, an overflow condition causing data to be written to a non-protected memory region where it can be accessed by the attacker.

Similarly, attempts to corrupt a software application's executable image can be performed using a trial and error method where malicious corruption of random cache lines storing the software application's executable image result in unexpected changes to program execution flow, potentially compromising the security causing data to be written to a non-protected memory region in the memory.

A hardware attack may also be used to substitute the executable image for the software application with a malicious executable image (code substitution) or to inject a malicious script into the image. For example, to perform code substitution, the attacker takes a snapshot of the contents of the protected region of external memory and replays the snapshot at a later time when another image is loaded in the same protected region. For example, to inject a malicious script, the attacker takes a snapshot of the stack when the image is stored in the protected memory region and replays the snapshot of the stack when a critical pointer or return address is stored in the exact same physical memory location at a later point in time.

A method and apparatus to provide cryptographic integrity checks and replay protections to protected regions of external physical memory in order to protect against malicious hardware attacks on the protected memory regions is provided according to the principles of the present invention.

Figure 1:
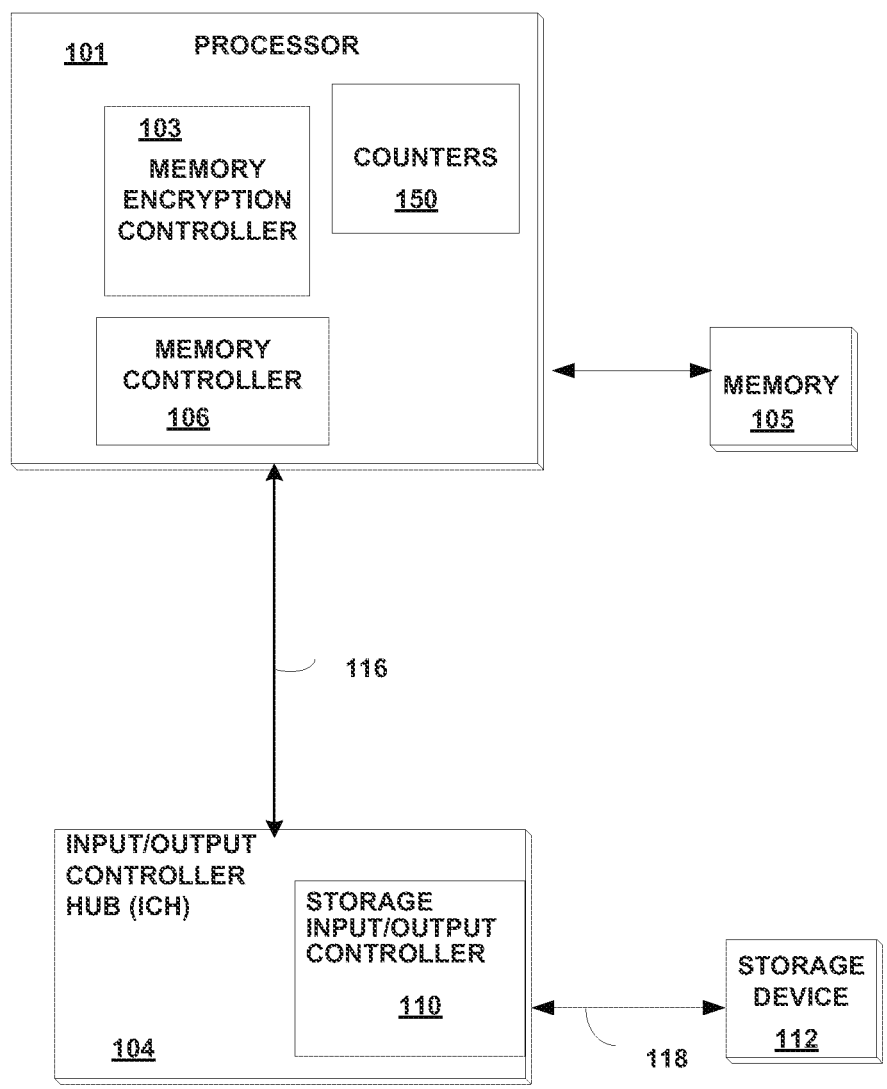
FIG. 1 is a block diagram of a system that includes a memory encryption controller for performing memory encryption according to the principles of the present invention.

FIG. 1 is a block diagram of a system 100 that includes a memory encryption controller 103 for performing memory encryption according to the principles of the present invention. The system 100 includes a processor 101 and an Input/Output (I/O) Controller Hub (ICH) 104. The processor 101 includes a memory controller 106 that controls communication between the processor 101 and external memory 105. The memory encryption controller 103 in the processor 101 may perform encryption and decryption on data that is stored in memory 105. The memory encryption controller 103 provides confidentiality against a passive attacker who can read the contents of the memory 105.

The processor 101 may be any one of a plurality of processors such as a single core Intel® Pentium 4 ® processor, a single core Intel Celeron processor, an Intel® XScale processor or a multi-core processor such as Intel® Pentium D, Intel® Xeon® processor, or Intel® Core® Duo processor or Intel Core processor or any other type of processor.

The memory 105 is a volatile memory that may be Dynamic Random Access Memory (DRAM), Static Random Access Memory (SRAM), Synchronized Dynamic Random Access Memory (SDRAM), Double Data Rate (DDR) RAM, Double Data Rate 2 (DDR2) RAM or Rambus Dynamic Random Access Memory (RDRAM) or any other type of volatile memory. In another embodiment the memory 105 can be a nonvolatile memory that may be NAND, NOR, Flash, Phase Change Memory (PCM) or Phase Change Memory with Switch (PCMS) or any other type of nonvolatile memory.

The ICH 104 may include a storage I/O controller 110 for controlling communication with at least one storage device 112 coupled to the ICH 104. As used herein, "storage device" may mean one or more apparatus and/or one or more portions thereof into, and/or from which, data may be stored and/or retrieved, respectively. Also as used in herein, the terms "mass storage" and "mass storage device" may be used interchangeably to mean storage capable of non-volatile storage of data. Storage device 112 may comprise respective mass storage that may comprise respective semiconductor, electromechanical, magnetic, and/or optical storage and/or mass storage, such as, for example, respective flash, magnetic disk, and/or optical disk storage and/or mass storage. Storage may be, for example, a hard disk drive, solid state drive, hybrid disk drive, Digital Video Disk (DVD) drive, Compact Disk (CD) drive, Redundant Array of Independent Disks (RAID), tape drive or other non-volatile storage device.

The storage I/O controller 110 may be capable of exchanging data and/or commands with a storage device ("storage") in accordance with, for example, Small Computer Systems Interface (SCSI) protocol, Fibre Channel (FC) protocol, SCSI over Internet Protocol (iSCSI), Serial Attached SCSI (SAS) protocol, Universal Serial Bus (USB) protocol and/or Serial Advanced Technology Attachment (S-ATA) protocol.

In another embodiment, the processor 101 and ICH 104 may be integrated into a single integrated circuit, that may be referred to as a System On a Chip (SOC).

An embodiment of the present invention will be described for protection of an address range in memory 105. In an embodiment, there are N counters 150 in the processor 101, each of the N counters is used to protect one of N ranges of addresses in memory 105. The range of addresses to be protected may be used to protect a memory region that is used by a secure software application. The protected memory region may be referred to as a "stolen memory area", that is, is a memory region (portion of memory) including a plurality of physical pages of memory that is not visible to an Operating System (OS). In an embodiment, the N counters 150 can be stored in a volatile memory in the processor 101, for example, the volatile memory can be Static Random Access Memory (SRAM).

One method to protect a memory region in the memory 105 that is used by a secure software application is to encrypt the data that is stored in the memory 105. The encryption and decryption of the data stored in memory regions in memory 105 is performed in the processor 101, using a key which is both generated and stored inside the processor 101.

In an embodiment, Secure Enclaves is a set of instructions that provides a safe place for an application to execute code and store data inside in the context of an Operating System (OS) process. An application that executes in this environment is called an enclave. Enclaves are executed from the Enclave Page Cache (EPC). The enclave pages are loaded into EPC by an OS. Whenever a page of an enclave is removed from the EPC, cryptographic protections are used to protect the confidentiality of the enclave and to detect tampering when the enclave is loaded back into the EPC. Inside the EPC, enclave data is protected using access control mechanisms provided by the processor.

Enclave Page Cache (EPC) is where enclave code is executed and protected enclave data is accessed. The EPC is located within the physical address space of a platform but can be accessed only using SE instructions. The EPC may contain pages from many different enclaves and provides access control mechanism to protect the integrity and confidentiality of the pages. The page cache maintains a coherency protocol similar to the one used for coherent physical memory in the platform.

However, encryption of the data by itself is designed to provide only confidentiality of the data. For example, encryption of the data stored in the memory regions helps protect confidentiality of the data from an attacker who can passively read the external memory, or can snoop the data as it is transferred between the processor 301 and the system memory 105. However, encryption of the data stored in the memory regions in external (system) memory 105 does not provide integrity checks. Storing the encrypted form of the data in the external memory 105 does not protect against an attacker who can actively modify or replay parts of the memory image stored in the external memory 105.

A malicious attacker (adversary) can copy from one memory location in the external memory 105 and write to a different memory location in the external memory 105. For example, the attacker may copy the contents of page x at address a onto page y at address b.

In another attack, an adversary with read/write access to the encrypted memory region can perform a replay attack by observing and recording the encrypted memory region locations (for example, at time 2 (t2)) and resetting the memory region by copying the contents of the encrypted region that was written at time 1 (t1). In yet another type of replay attack, the attacker that performs a replay attack may have control of one of two different applications (contexts) that may reside at the same memory region at different times. For example, the attacker may be using one of the applications to attack the other application.

An embodiment of the present invention mitigates replay attacks by reducing the effect of such attacks to no more than the ability to induce random (unpredictable and uncontrollable) changes to a memory image.

Figure 2:
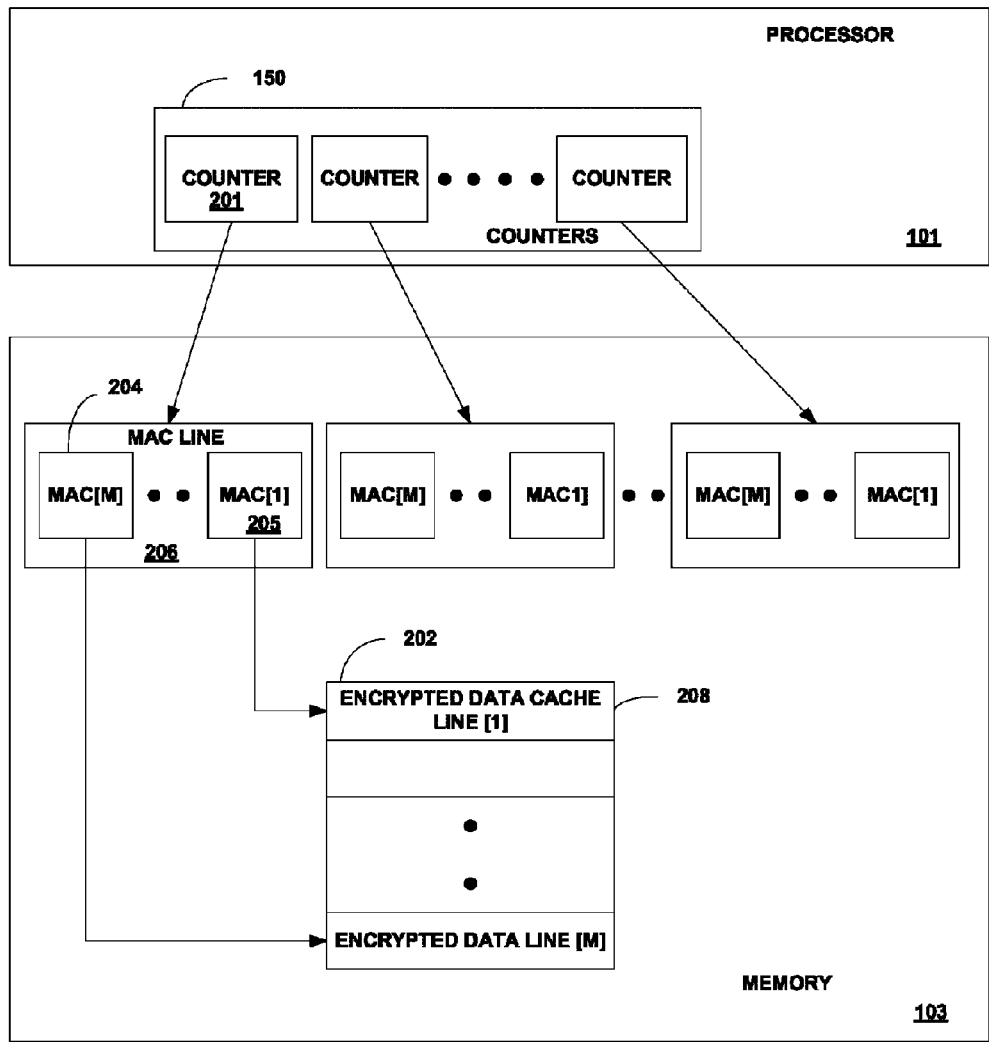
FIG. 2 is a block diagram illustrating the N counters in the processor used by the encryption engine to perform tree-based replay protection to protect address ranges in memory and Message Authentication Code (MAC)s stored in memory to provide cryptographic integrity checks according to the principles of the present invention.

FIG. 2 is a block diagram illustrating the N counters 150 in the processor 101 used by the memory encryption controller to perform tree-based replay protection to protect address ranges in memory 105 and Message Authentication Code (MAC)s stored in memory 105 to provide cryptographic integrity checks according to the principles of the present invention.

The region (address range) of memory to be protected 202 is represented by a plurality of data cache lines 208 and a plurality of Message Authentication Codes (MAC)s 204 stored in a MAC line 206. In the embodiment shown in FIG. 2, the region of memory to be protected (the "stolen memory area") 202 includes M data cache lines 208. Each of the M data cache lines 208 is associated with one MAC 204. A MAC is a result of a one-way hash function computed on a message and a secret key. In the embodiment shown, the MAC is the result of a one-way hash performed on the contents of a data cache line 208 and a key that is generated during processor reset by a Random Number Generator in the processor. In an embodiment, the same key is used to perform the one-way hash for each of the M data cache lines. The MAC 204 is applied to a cache line and is compared against a recomputed MAC used when reading and decrypting the contents of a cache line 208 to detect if the encrypted block of data stored in the cache line 208 has been altered while stored in the cache line 208.

A tree-based replay protection scheme could be provided by a tree structure that includes a tree root, a MAC cache line 206 and a data cache line 208. There are N counters 150 in the processor 101, one counter per MAC cache line 206 in the memory 105. The tree root is one of the counters 201 in the N counters 150 in the processor 101 that is used to protect the contents of a MAC cache line 206. In an embodiment, the number of cache lines (M) is 16, each MAC cache line 206 has 512-bits to store 16 32-bit MACs 204 and each data cache line 208 has 512-bits (64 bytes).

In an embodiment, the contents of each cache line (CL) 208 in the memory 105 that needs protection is encrypted using XEX encryption mode with tweak and ciphertext stealing (XTS). The XEX encryption mode with tweak and ciphertext stealing (XTS)-Advanced Encryption Standard (AES) Tweakable Block Cipher (IEEE Standard 1619-2007) is a mode of operation under National Institute of Standards and Technology (NIST) Federal Information Processing Standards (FIPS) 140-2 which defines elements of an architecture for cryptographically protecting data stored in constant length blocks. In other embodiments, the contents of each cache line (CL) is plaintext (non-encrypted).

The XTS-AES mode of operation applies to encryption of a data stream divided into consecutive equal-size data units with the exception that the last data unit of the data stream may be smaller than the others. Each data unit has 128 or more bits of data within a key scope. The key scope is data encrypted by a particular key, divided into equal-sized data units. The key scope is identified by three non-negative integers: a tweak value corresponding to the first data unit, the data unit size, and the length of the data. The tweak value is a 128-bit value used to represent the logical position of the data in the data stream that is being encrypted or decrypted with XTS-AES. Each data unit is assigned a tweak value that is a non-negative integer. The tweak values are assigned consecutively starting with an arbitrary non-negative integer.

The XTS-AES mode of operation is a "tweakable narrow-block encryption", and is the standard mode for disk encryption (data-at-rest encryption). It can be viewed as encryption in Electronic Code Book (ECB) mode, where the encryption uses a tweak value (tweak) that modifies the encryption of a data block as a function of its "index" position. In ECB mode, each plaintext block is encrypted independently with the block cipher. For disk encryption, in the XTS-AES mode of operation, the tweak is used for binding the encryption to a sector on a disk drive (storage media) which is encrypted.

In an embodiment, a memory encryption unit (controller) uses the XTS-AES mode of operation for binding encryption to the (physical) memory address of a processed data block. Using AES-XTS helps, to a large extent, against an attacker who can physically manipulate the encrypted memory images, and attacks by swapping the positions of encrypted blocks, or by overwriting encrypted blocks with other encrypted blocks. As the AES-XTS tweak is a function of the physical memory address, such an attack becomes equivalent to the much weaker attack of inducing random changes that are unpredictable and uncontrollable by the attacker. In other words, the attacker does not gain from swapping/overwriting more than what the attacker can gain from "blindly" changing the memory.

In the standard XTS mode for disk encryption, an AES-XTS of a data block P, whose index is (j) in a unit (u) is performed by first generating a tweak value and then generating ciphertext from the plaintext using the tweak value.

For example, a tweak value (X) is generated using a 16 byte key value (K1) on a block identifier (unit (u), the unit's position (j) in that unit (u)) and a polynomial (Poly) $x^{128}+x^7+x^2+x+1$ as shown below:

$$X = AES(K1, u) * 2^j \mod Poly \qquad \text{Equation 1}$$

where: "*" denotes carry-less multiplication

Having generated the tweak value (X), the ciphertext (C) is generated from the plaintext (P) using the tweak value (X) and another 16 byte key value (K2) as shown below:

$$C = AES(K2, P+X) + X \qquad \text{Equation 2}$$

AES-XTS reserves 64 bits (8 bytes) for the value of the unit (u). As the AES encryption operates on 16 byte blocks, the 64 remaining bits (8 bytes) of the block (16 Bytes) (="u") which are encrypted as shown in Equation 1, are defined as 0.

AES-XTS can be applied to memory encryption by defining a "unit" to be a 64 Byte cache line, and the index j=0, 1, 2, 3 to indicate the position of the 16 byte (128-bit) data block in that cache line. In this case, the value of "u" is the (physical) address of the cache line. Physical addresses are typically encoded using 48 bits.

Each MAC line 206 is encrypted using an extended AES-XTS mode (XTS+). In the extended AES-XTS mode, the standard AES-XTS mode is extended to use more information in the tweak (extended tweak). The extended tweak includes, in addition to the standard information, for example, the cache line address and block position, and/or a time stamp value.

In an embodiment, the bits in the extended tweak that store the additional information reside in the top (most significant) 64 bits of the extended tweak. As discussed earlier, the most significant bits are set to 0 in the standard AES-XTS mode. In another embodiment, the additional information resides in other bits which are guaranteed to be zero. Thus, extended AES-XTS is a generalization of the standard AES-XTS because if all the additional information bits are degenerated to 0, the encryption is the standard XTS mode.

In one embodiment, the extended tweak is generated using cache line address and time as shown below in Equation 3:

$$X = AES(K1, T|u) * 2^j \mod Poly \qquad \text{Equation 3}$$

Where P is a data block, whose index is j, in the unit u, encrypted at time indicated by T, and the symbol "|" denotes concatenation.

The extended tweak is generated such that the tweak describes consecutive integers, counting addresses of a region at time 0, 1, . . . , 2^(32)−1).

The tweak for ML [j] (at time TIME and at address ACL) (with j=0, 1, 2, . . . , m−1, and TIME=0, 1, 2, . . . 2^(32)−1) is:

TWEAK=00 . . . 0 [127:55]|(ACL [j]>>6) [33:n+14]|TIME [31:0]|(ACL [j]>>6) [n+13:0]
  where: Unit=MAC cache line (ML);
    each ML is 2^(6)=64 bytes which is (4×128-bit (2^(20)) blocks);
    each ML has a 40-bit base-address, ACL [39:0] with ACL [5:0]=[000000]; a partition has 2^n MB;
    m (the number of MLs)=2^(n+14);
    j is one of m MLs in a datastream;
    the data stream is the m ML's, at different times, namely ML [j] (at time t), as follows:
    ML[0], ML [1], . . . , ML [m−1] at time t=0
    ML[0], ML [1], . . . , ML [m−1] at time t=1
    . . .
    ML[0], ML [1], . . . , ML [m−1] at time t=2^(32)−1 and the base-address for <ML [j] is denoted by ACL [j] (where j=0, 1, 2, ..., m−1).

When going over the MLs (in the order specified above), the TWEAK runs consecutively over all the positive integers starting from the positive integer 00 . . . 0 [127:55]|(ACL[0]>>6)[33:n+14]|00 . . . 0 [31:0]| (ACL[0]>>6) [n+13:0]

and ending with

00 . . . 0 [127:55]|(ACL[m−1]>>6)[33:n+14]|11 . . . 1[31:0] |(ACL[m−1]>>6) [n+13:0]

For, example:

Consider a 2 MB partition, with n=1, and m=15.

The tweak for ML [j] at time TIME (32 bits) is defined as follows

00 . . . 0 [127:55]|(ACL[j]>>6) [33:15]|TIME [31:0]|(ACL [j]>>6) [14:0]

Figure 3:
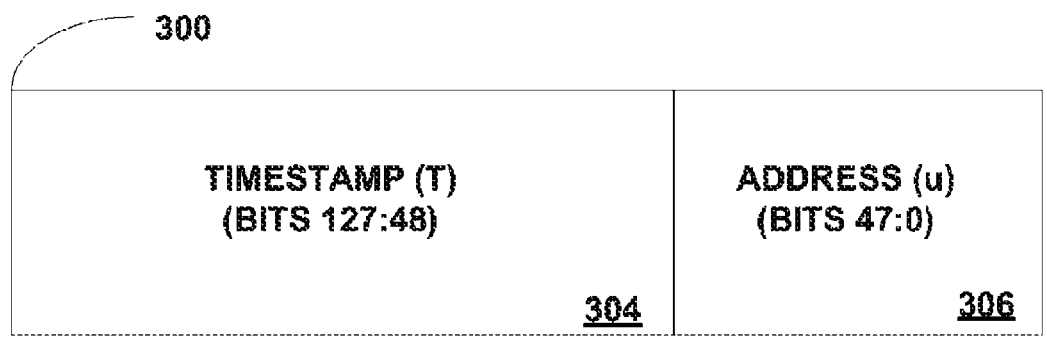
FIG. 3 illustrates one embodiment of an extended tweak.

FIG. 3 illustrates one embodiment of an extended tweak 300. The extended tweak 300 shown in FIG. 3 is a 128-bit value. The least significant 48 bits (Bits 47:0) 306 of the extended tweak 300 are reserved for the address (u) and the remaining 80 Most Significant bits (Bits 127:48) 304 are reserved for the time stamp (T).

Returning to FIG. 2, each MAC cache line 206 is encrypted using an extended tweak 300, with the start address of a group of four MACs in the MAC cache line 206 stored in the least significant bits ("address (u)") 306 of the extended tweak 300 and the value of the counter 201 associated with the MAC line 206 stored in the most significant bits ("time stamp (T)") 304. Each group of 4 MACs in an MAC cache line 206 corresponds to a 128-bit block and has a corresponding unique address used in the extended XTS tweak.

Figure 4:
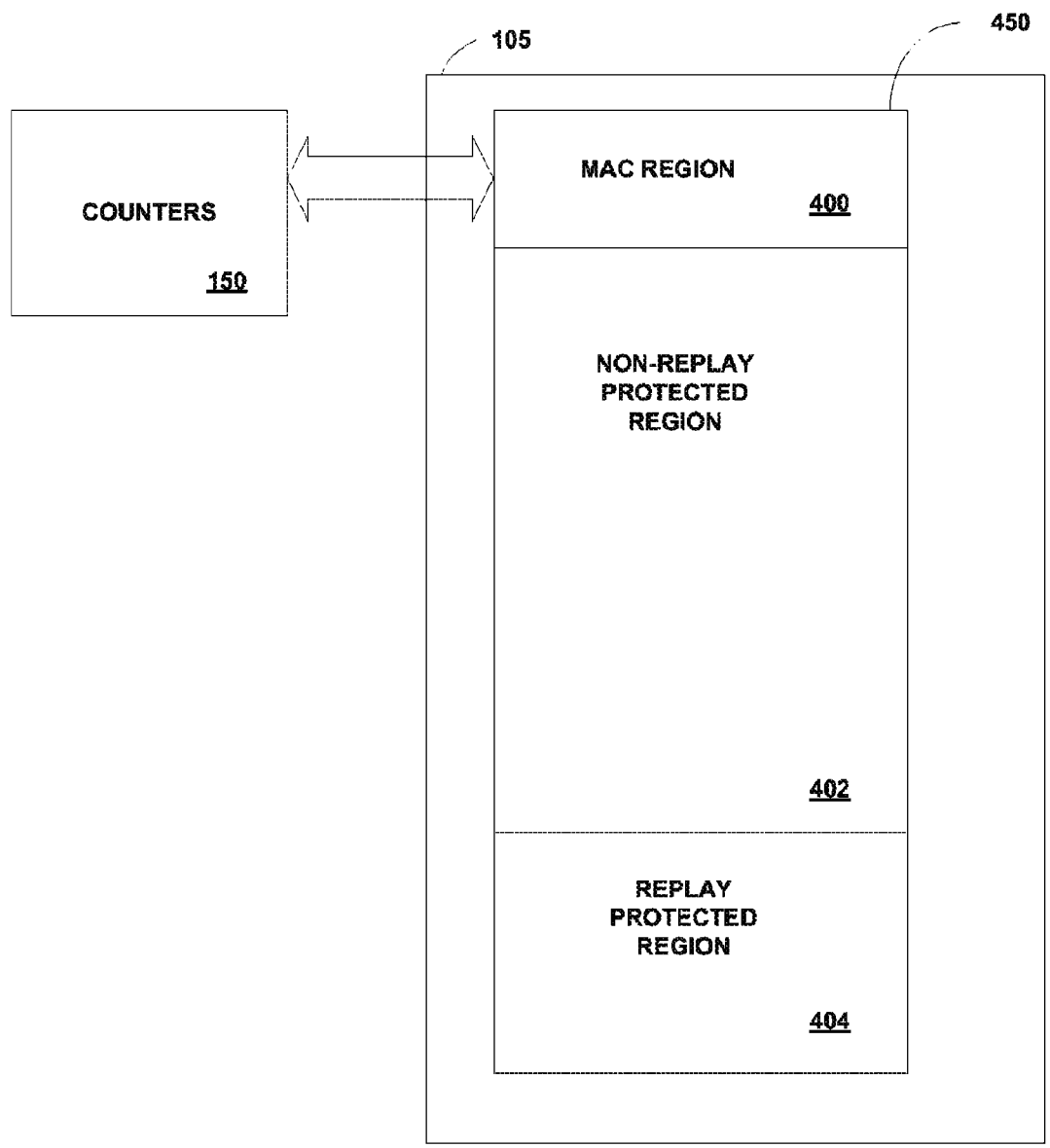
FIG. 4 is a block diagram illustrating an embodiment of regions in the system memory shown in FIG. 1 for protecting a secure application stored in the system memory.

FIG. 4 is a block diagram illustrating an embodiment of regions in the system memory 105 shown in FIG. 1 for protecting a secure application stored in the system memory 105. The system memory 105 includes a protected region 450. The protected region 450 includes a replay-protected region 404, a non-replay protected region 402 and a MAC region 400. In an embodiment, data stored in both the replay protected region 404 and the non-replay protected region 402 is encrypted using XTS-AES as discussed earlier in conjunction with FIG. 2. Encrypted data stored in the MAC region 400 is encrypted using extended XTS-AES as discussed in conjunction with FIGS. 2 and 3. In another embodiment, data stored in both the replay protected region 404 and the non-replay protected region 402 is plaintext (non-encrypted) data.

The MAC region 400 includes a MAC 205 for each cache line 208 in the replay protected region 404. The counters 150 in the processor 101 include a counter 201 for each MAC Cache Line (ML) 206 in the MAC region 400. The use of a MAC 205 per cache line 208 in the replay protected region 404 provides integrity protection to the replay protected region 404. The use of a counter 201 per ML 206 in the MAC region 400 provides replay protection to the replay protected region 404.

In an embodiment, the size of the replay protected region 404 is 8 Mega Bytes (MB), with each cache line 208 having 64 Bytes (512 bits), the replay protected region 404 has 128K cache lines. In an embodiment with 16 MACs per ML 206, 8192 MLs store the 128K MACs for the 128K cache lines. With each MAC having 32-bits, and one MAC stored in the MAC region 400 for each of the 128K cache lines in the replay protected region 404, the MAC region 400 is 512 Kilo Bytes (KB). Each of the MLs has a respective counter 201 stored in counters 150. In an embodiment, each of the 8192 MLs has a 60-bit counter used for the extended tweak and 60 KB of volatile memory (for example, Static Random Access Memory (SRAM)) is used to store the 8192 counters in the processor 101. Storing 8192 60-bit counters in memory 105 consumes 8 times less memory in the processor than the 512 KB required to store the 32-bit MACs for each cache line in the replay protected region 404.

During initialization of the processor 101, the counters 150 are initialized to a non-random value. In an embodiment, the non-random value is zero. The cache lines 208 and MLs 206 in the memory are also initialized to a non-random value which may be values other than zero. In addition, a key for generating MACs is initialized to a random value. In an embodiment, the key is sampled from a random number generator in the processor 101.

In the embodiment shown in FIG. 4, the Replay Protected Region is at the lower address region of the memory and the MAC line region is at the upper address region of the memory. A region base address register stores the address of the bottom of the Replay Protected Region (RPR_ADDRESS) and a MAC region base address register stores the address of the bottom of the MAC line region (MLR_ADDRESS).

The offset of a cache line at address 'A' in the Replay Protected Region is 16 times greater than the offset of the MAC cache line that matches the address, from the MAC region base address, because each MAC cache line covers 16 lines in the Replay Protected Region.

Thus, the address of the MAC cache line (MAC_LINE_ADDRESS) corresponding to address 'A' can be computed as follows:

MAC_LINE_ADDRESS=[(address 'A'−RPR_ADDRESS/ 16]+MLR_ADDRESS

In an embodiment with 64 byte cache lines in the Replay Protected Region, the mapping of a 40-bit cache line address (Address[39:0]) in the Replay Protected Region to the matching MAC line address and the index of the XTS+ counter in the SRAM array entry is performed as follows:

Bits [5:0] of the cache line address are always 0 (due to 64 byte alignment.

Bits [9:6] of the cache line address store the index of the MAC value (to select one of 16) in the MAC line corresponding to the cache line.

Bits [22:10] of the cache line address identify one of 8192 MAC Cache lines and the counter associated with the MAC Cache line.

Bits [39:23] of the cache line address store the base address of the Replay Protected Region.

Figure 5:
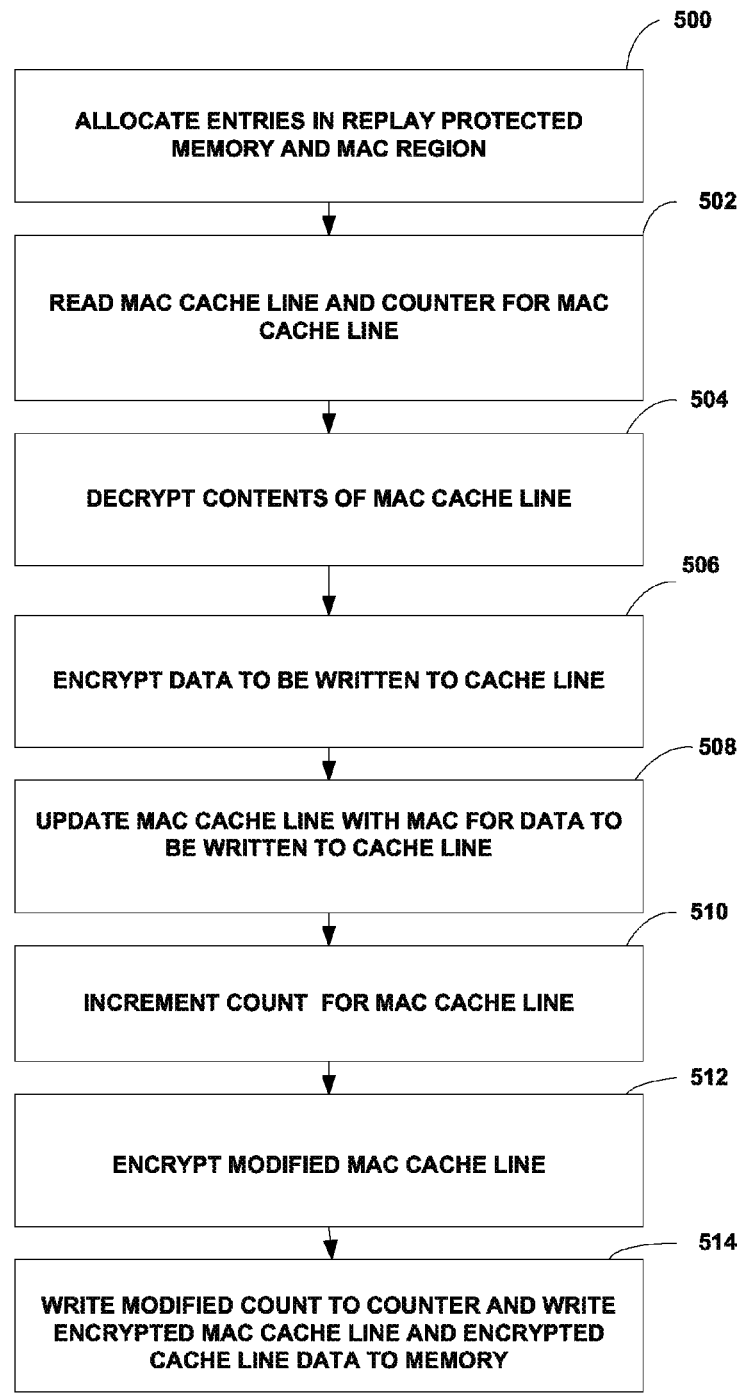
FIG. 5 is a flow chart illustrating an embodiment of a method for performing a write access to a cache line in the encrypted region shown in FIG. 4.

FIG. 5 is a flow chart illustrating an embodiment of a method for performing a write of a data block to a cache line 208 in the protected region 450 shown in FIG. 4.

When a software application is stored in (written to) memory 105, the software application populates one or more cache lines 208 in the replay protected region 404 in memory 105. In an embodiment, each cache line 208 has 64 bytes (512-bits). Each cache line 208 has a corresponding 32-bit MAC 204 that is stored in a ML 206 in the MAC region 400 in the memory 105. Whenever a cache line 208 (in the replay protected region 404) is populated for the first time, the corresponding counter 201 for the MAC cache line 206 that holds the MAC 204 for that cache line 208, is incremented 101.

At block 500, a cache line 208 is allocated in the replay protected region 404 of the memory 105 to store the data to be written. Also, a MAC entry 204 is allocated in the MAC region 400 of the memory 105 to store a MAC for the data to be written to the cache line 208 in the replay protected region 404. Each cache line (of data) 208 has its own MAC stored in a MAC entry 204. The MACs of several cache lines (of data) 208 are stored in MAC entries 204 in one ML line 206 of the MAC region 400. In an embodiment in which a MAC has 32 bits, 16 MACs are stored in one 512-bit ML 206 in the MAC region 400. In an embodiment, the cache lines in the MAC region 400 are XTS+ encrypted, with each ML 206 in the MAC region having a respective counter. Processing continues with block 502.

At block 502, the contents of a counter 201 associated with the ML 206 storing the MAC 204 for the cache line 208 is read. The contents of the ML 206 are also read. In an embodiment, the ML 208 has 512-bits to store 16 32-bit MACs, one MAC for each of 16 cache lines 208. Processing continues with block 504.

At block 504, the contents of the ML 206 are decrypted in order to recover the plaintext for the MACs stored in the ML 206. The decryption is performed using the XTS-AES enhanced tweak mode of operation ("extended XTS-AES"). A memory encryption controller 103 in the processor 101 implements the XTS-AES enhanced tweak mode of operation where T is the counter value and u is the physical address of the MAC cache line, and j is the block's index. In this way, the tweak value (X) is bounded not only to the address of the ML 206 in the memory 450, but also to the counter value ("timestamp value") which the processor 101 stored at the time that the ML 206 was allocated in memory 105.

The "counter" and the method in which it is initialized and incremented may vary. In an embodiment, a counter can be a linear feedback shift register (LFSR), which is initialized to a nonzero value that is fixed or randomized and incremented using a clock input. In another embodiment, a counter can be a register including incrementing logic which is initialized either randomly or deterministically. In yet another embodiment, a counter can be a value which is sampled from a random bit generator. The length (number of output bits) of the counter can determined in such a way that trying to replay a copied image at the same counter value, is impractical. Processing continues with block 506.

At block 506, the data to be written to the cache line 208 is encrypted using XTS-AES. Processing continues with block 508.

At block 508, data to be written to the ML 206 storing the MAC associated with the cache line 208 to be written is generated by performing a merge (read-modify-write) of the current contents of the ML 206 with the MAC generated from the unencrypted data to be stored in the cache line 208. To update the contents of one of the MAC entries in the ML 206, the entire ML 206 is read and decrypted, new data for the MAC entry is written to the ML 206, and the contents of the ML 206 is encrypted, written and stored in the ML region. Processing continues with block 510.

At block 510, the timestamp value ("count") read from the counter associated with the ML 206 is incremented. Processing continues with block 512.

At block 512, the modified contents of the ML 206 is encrypted using the extended XTS-AES with the modified "timestamp value". Processing continues with block 514.

At block 514, the modified "timestamp value" is written to the counter 201 associated with the ML 206 in the processor, the modified ML is written to the ML 206 and the encrypted data is written to the cache line 208. Processing is complete.

In the embodiment described in conjunction with FIG. 5, the data block is encrypted prior to writing to the cache line 208. In other embodiments, block 506 is not performed and the data to be written to the cache line 208 is plaintext (non-encrypted).

Figure 6:
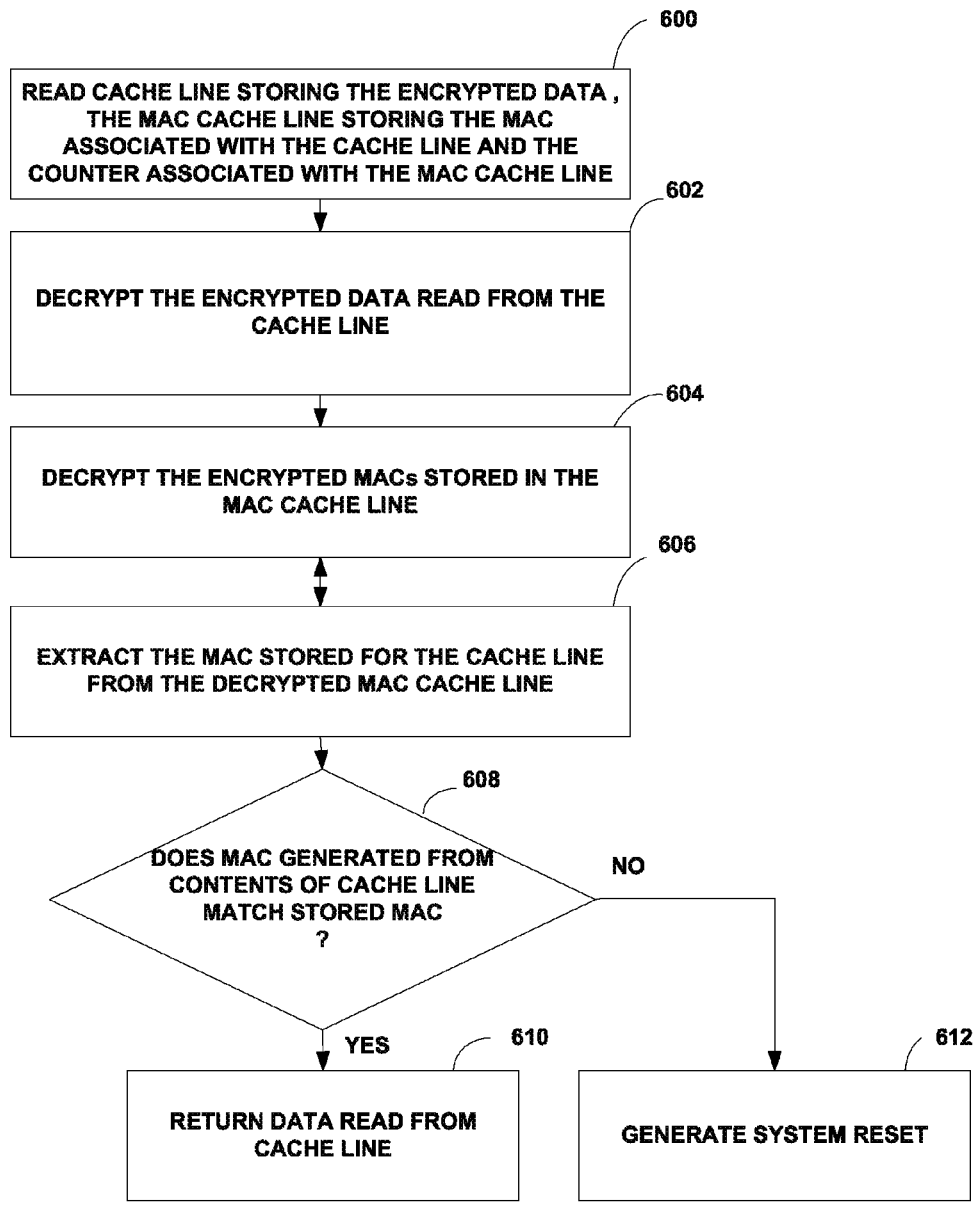
FIG. 6 is flow chart illustrating an embodiment of a method for performing a read access to the encrypted region shown in FIG. 4.

FIG. 6 is flow chart illustrating an embodiment of a method for performing a read access to the protected region 450 shown in FIG. 4.

At block 600, a cache line 208, the ML 206 that stores the MAC 205 for the cache line 208 and the counter 201 in counters 150 associated with the ML 206 are read. The cache line 208, ML 206 and counter 201 are determined based on the memory address in the read command as discussed in conjunction with FIG. 4 Processing continues with block 602.

At block 602, the encrypted data read from the cache line 208 is decrypted using XTS-AES. Processing continues with block 604.

At block 604, the encrypted MACs 205 read from the ML 206 are decrypted using extended XTS-AES and the timestamp value read from the counter associated with the ML 206. Processing continues with block 606.

At block 606, the MAC 205 associated with the cache line 208 is extracted from the plurality of MACs in the decrypted (plaintext) contents of the ML 206. In an embodiment there are 16 32-bit MACs 205 stored in the 512-bit ML 206. A MAC 205 is generated using the plaintext result of the decryption of the data read from the cache line 208. Processing continues with block 608.

At block 608, the generated MAC is compared with the MAC read from the ML 206. If equal, processing continues with block 610. If there is a mismatch, processing continues with block 612.

At block 610, the data (plaintext) read from the cache line 208 is returned.

At block 612, a mismatch has been detected and a system reset is generated.

In the embodiment described in conjunction with FIG. 6, the data read from the cache line 208 is encrypted. In other embodiments, block 602 is not performed as the data read from the cache line 208 is plaintext (non-encrypted).

In an embodiment the number of bits in each MAC is 32 in order to decrease the amount of memory used to store the MACs and the time to compute the respective MAC for each of the plurality of cache lines. If the attacker modifies the encrypted image, the attacker has a probability of $2^{-32}$ of succeeding in a single attempt. Each mismatch results in a shutdown of the system caused by a system reset as discussed in conjunction with FIG. 6. After a shutdown, the system is initialized with a new random key to generate MACs. In an embodiment, each failed attack cycle takes at least one second, from initialization to booting an operating system and finally running the attack script. Thus, successive attempts could take up to $2^{32}$ seconds (about 146 years).

The tree-based replay protection scheme shown in FIG. 2 is secure and protects the contents of the cache lines from tampering. The tree-based replay protection scheme defends against both dictionary and birthday attacks.

A dictionary attack uses a technique of successively trying a subset of values from a list (referred to as a dictionary) instead of all possible values. A dictionary attack tries only those values which are most likely to succeed. An attacker can harvest pairs of cache lines and corresponding MACs to build a dictionary. The attacker can then dynamically search the dictionary for matching MACs, and replay the ciphertext from harvesting cache lines.

For example, with a 32-bit MAC, the attacker can prepare a table storing the encrypted image of $2^{32}$ "versions" of a cache line to be attacked and the corresponding MAC line storing the MAC value for the cache line to be attacked. When the cache line is written, the attacker can replace its encrypted contents with a malicious encrypted version of the cache line and replace the corresponding encrypted contents of the MAC line with the matching encrypted contents from the table. This would pass the MAC check resulting in a successful attack. However, because the MAC line is encrypted using extended XTS-AES, the encryption of the exact same MAC line with two different counter values is different making it impossible/infeasible from a practical point of view for the attacker to build a dictionary. Thus, the tree-based replay protection scheme defends against a dictionary attack.

A birthday attack is a type of cryptographic attack that exploits the mathematics behind the birthday problem in probability theory, that is, the probability that in a (sufficiently large) set of randomly chosen people, some pair will have the same birthday.

For example, the birthday paradox can apply to data stored in two cache lines, if MACs are encrypted in a way that is independent of address and the attacker can generate the plaintext of the encrypted data stored in a cache line CL. When the attacker sees two cache lines storing the same value and knowing MAC (CL1)=MAC (CL2), the attacker can determine information on the key that was used for producing the MAC. The information about this key allows for creating a forged data line that would have a desired MAC value and thus pass the MAC check.

Typically, to defend against birthday attacks, the number of bits in the MAC is chosen to be sufficiently large, so that the birthday attack becomes impractical. In an embodiment, although the MAC is short (small number of bits), the MAC line is encrypted using extended XTS-AES, thus, the encryption of the exact same MAC line with two different counter values is different which defends against a birthday attack. In addition, the counters are initialized to a fixed value not randomly in order to prevent birthday attacks on the counters.

In an embodiment, the tree-based replay protection scheme can be extended to an N-level tree, by providing another level of counters in the external memory. These counters are encrypted using extended XTS-AES, the counters in the processor and the address of the counters in external memory. The counters stored in external memory are used in the extended XTS-AES encryption of the MAC lines or in the extended XTS-AES encryption of another level of counters in the external memory.

The tree-based replay protection scheme provides both integrity checking and replay protection of the protected region in external memory. For example, if an attacker randomly corrupts a MAC line in the external memory, each of the 32-bit MACs in the MAC line is randomly modified via decryption. The probability of a successful attack is $2^{-32}$. Failure results in a reset that takes about one second as discussed earlier. If an attacker randomly attacks a cache line in the external memory, the probability of a successful attack is $2^{-32}$. Failure results in a reset that takes about one second as discussed earlier.

If an attacker replays a MAC line without counter rollover, this results in random corruption of the MAC line which results in a reset as discussed earlier. If an attacker replays a MAC line with successful counter rollover, the attack would succeed but in practice, rolling over a 60-bit counter would take too much time to make such attack strategy feasible.

An embodiment has been described for XTS-AES, however the extended tweak mode is not limited to XTS-AES and can be applied in other embodiments to other tweakable encryption schemes. For example, in an embodiment for the LRW (M. Liskov, R. Rivest, and D. Wagner) tweakable block cipher, LRW can be enhanced to an enhanced LRW mode in an analogous way.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
generating, by a processor, a message-authentication code (MAC) for a block of data associated with an application;
providing, in a processor, a plurality of counters, each counter associated with one of a plurality of MAC cache lines in a memory;
encrypting, by the processor, the MAC, the MAC encrypted using a tweak, the tweak including a cache line identifier for the MAC cache line to store the MAC and a timestamp value read from the counter associated with the MAC cache line;
storing, by the processor, the block of data in a cache line of the memory; and
storing, by the processor, the MAC in a MAC cache line in the memory, the memory separate from the processor.

2. The method of claim 1, wherein the application is a secure application, the block of data is encrypted by the processor and the encrypted block of data is stored by the processor in the cache line of memory.

3. The method of claim 1, wherein the tweak is an XEX encryption mode with tweak and ciphertext stealing (XTS)-Advanced Encryption Standard (AES) tweak.

4. The method of claim 1, wherein the tweak is a LRW tweak.

5. The method of claim 1, wherein the MAC cache lines are in a protected region of the memory.

6. The method of claim 1, wherein the cache lines are in a replay protected region of the memory.

7. The method of claim 1, wherein the MAC has 32-bits, the MAC cache line has 512-bits and the cache line has 512-bits.

8. An apparatus comprising:
a plurality of counters each counter associated with one of a plurality of MAC cache lines in an external memory; and
logic, the logic to generate a message-authentication code (MAC) for a block of data associated with an application stored in the external memory, the logic to encrypt the MAC, the MAC encrypted using a tweak, the tweak including a cache line identifier for the MAC cache line to store the MAC and a timestamp value read from the counter associated with the MAC cache line, the logic to store the block of data in a cache line of the external memory and to store the MAC in a MAC cache line in the external memory.

9. The apparatus of claim 8, wherein the application is a secure application, the block of data is encrypted by the processor and the encrypted block of data is stored by the processor in the cache line of memory.

10. The apparatus of claim 8, wherein the tweak is an XEX encryption mode with tweak and ciphertext stealing (XTS)-Advanced Encryption Standard (AES) tweak.

11. The apparatus of claim 8, wherein the tweak is a LRW tweak.

12. The apparatus of claim 8, wherein the MAC cache lines are in a protected region of the external memory.

13. The apparatus of claim 8, wherein the cache lines are in a replay protected region of the external memory.

14. The apparatus of claim 8, wherein the MAC has 32-bits, the MAC cache line has 512-bits and the cache line has 512-bits.

15. An article including a non-transitory machine-accessible medium having associated information,
wherein the information, when accessed, results in a machine performing:
generating, by a processor, a message-authentication code (MAC) for a block of data associated with an application;
providing, in a processor, a plurality of counters, each counter associated with one of a plurality of MAC cache lines in a memory;
encrypting, by the processor, the MAC, the MAC encrypted using a tweak, the tweak including a cache line identifier for the MAC cache line to store the MAC and a timestamp value read from the counter associated with the MAC cache line;
storing, by the processor, the block of data in a cache line of the memory; and
storing, by the processor, the MAC in a MAC cache line in the memory, the memory separate from the processor, the block of data is encrypted by the processor and the encrypted block of data is stored by the processor in the cache line of memory.

16. The article of claim 15, wherein the application is a secure application.

17. The article of claim 15, wherein the tweak is an XEX encryption mode with tweak and ciphertext stealing (XTS)-Advanced Encryption Standard (AES) tweak.

18. The article of claim 15, wherein the tweak is a LRW tweak.

19. A system comprising:
a mass storage device to store an application; and
a processor comprising:
a plurality of counters each counter associated with one of a plurality of MAC cache lines in an external memory; and
logic, the logic to generate a message-authentication code (MAC) for a block of data associated with the application stored in the external memory, the logic to encrypt the MAC, the MAC encrypted using a tweak, the tweak including a cache line identifier for the MAC cache line to store the MAC and a timestamp value read from the counter associated with the MAC cache line, the logic to store the block of data in a cache line of the external memory and to store the MAC in a MAC cache line in the external memory.

20. The system of claim 19, wherein the tweak is an XEX encryption mode with tweak and ciphertext stealing (XTS)-Advanced Encryption Standard (AES) tweak.

\* \* \* \* \*